(12) United States Patent
Salter et al.

(10) Patent No.: US 10,501,025 B2
(45) Date of Patent: Dec. 10, 2019

(54) VEHICLE BADGE

(71) Applicant: Ford Global Technologies, LLC, Dearborn, MI (US)

(72) Inventors: Stuart C. Salter, White Lake, MI (US); Jeffrey Singer, Plymouth, MI (US); Paul Kenneth Dellock, Northville, MI (US); Michael A. Musleh, Canton, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 15/061,087

(22) Filed: Mar. 4, 2016

(65) Prior Publication Data

US 2017/0253194 A1 Sep. 7, 2017

(51) Int. Cl.
| | |
|---|---|
| *B60R 13/00* | (2006.01) |
| *F21V 9/30* | (2018.01) |
| *F21V 3/00* | (2015.01) |
| *F21V 7/00* | (2006.01) |
| *F21Y 115/10* | (2016.01) |

(52) U.S. Cl.
CPC .............. *B60R 13/005* (2013.01); *F21V 3/00* (2013.01); *F21V 7/00* (2013.01); *F21V 9/30* (2018.02); *F21Y 2115/10* (2016.08)

(58) Field of Classification Search
CPC ........ B60Q 1/2696; B60Q 1/28; B60R 13/005
See application file for complete search history.

(56) References Cited

U.S. PATENT DOCUMENTS

| | | | |
|---|---|---|---|
| 2,486,859 A | 11/1949 | Meijer et al. | |
| 4,977,695 A | 12/1990 | Armbruster | |
| 5,053,930 A | 10/1991 | Benavides | |
| 5,434,013 A | 7/1995 | Fernandez | |
| 5,709,453 A | 1/1998 | Krent et al. | |
| 5,806,957 A | 9/1998 | Prior et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jong-Suk (James) Lee
*Assistant Examiner* — Christopher E Dunay
(74) *Attorney, Agent, or Firm* — Vichit Chea; Price Heneveld LLP

(57) ABSTRACT

A badge is provided herein. The badge includes a substrate attached to a housing. The housing includes a viewable portion. A light source is operably coupled with an optic. A reflective member is further disposed within the badge. A first portion of an excitation light emitted from the light source is directed through the optic toward a first portion of the viewable portion. A second portion of the excitation light is reflected by the reflective member towards a second portion of the viewable portion.

9 Claims, 7 Drawing Sheets

(56) References Cited

U.S. PATENT DOCUMENTS

| | | | |
|---|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,192,148 B2 | 3/2007 | Tsai et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,752,989 B2 | 6/2014 | Roberts et al. |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2005/0243568 A1* | 11/2005 | Rodriguez Barros ........................ B60Q 1/2665 362/494 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0030993 A1* | 2/2008 | Narendran ........... G02B 6/0003 362/296.07 |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1* | 10/2009 | Kino ..................... B60Q 1/323 362/602 |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0044022 A1 | 2/2011 | Ko et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0138874 A1* | 6/2012 | Yuan ..................... C09K 11/02 252/582 |
| 2012/0183677 A1 | 7/2012 | Agrawal et al. |
| 2012/0224363 A1* | 9/2012 | Van De Ven ......... H01L 33/505 362/231 |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0076397 A1 | 3/2014 | Wagenblast et al. |
| 2014/0091915 A1* | 4/2014 | Rodriguez Barros .. B60R 1/082 340/435 |
| 2014/0103258 A1 | 4/2014 | Agrawal et al. |
| 2014/0151736 A1* | 6/2014 | Narendran ........... H01L 33/507 257/98 |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0109807 A1* | 4/2015 | Chen ..................... F21S 41/24 362/511 |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |

(56) References Cited

U.S. PATENT DOCUMENTS

2017/0158125 A1  6/2017  Schuett et al.
2017/0253179 A1  9/2017  Kumada

FOREIGN PATENT DOCUMENTS

| CN | 201193011 Y   | 2/2009  |
|----|---------------|---------|
| CN | 204127823 U   | 1/2015  |
| DE | 4120677 A1    | 1/1992  |
| DE | 29708699 U1   | 7/1997  |
| DE | 10319396 A1   | 11/2004 |
| EP | 1793261 A1    | 6/2007  |
| EP | 2778209 A1    | 9/2014  |
| JP | 2000159011 A  | 6/2000  |
| JP | 2007238063 A  | 9/2007  |
| KR | 20060026531 A | 3/2006  |
| WO | 2006047306 A1 | 5/2006  |
| WO | 2014068440 A1 | 5/2014  |
| WO | 2014161927 A1 | 10/2014 |

* cited by examiner

VEHICLE BADGE

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge is disclosed. The badge includes a substrate attached to a housing. The housing has a viewable portion. A light source is operably coupled with an optic. The badge further includes a reflective member. A first portion of an excitation light emitted from the light source is directed through the optic toward a first portion of the viewable portion and a second portion of the excitation light is reflected by the reflective member towards a second portion of the viewable portion.

According to another aspect of the present invention, a badge is disclosed. The badge includes a substrate attached to a housing. The housing has a viewable portion. A light source configured to emit an excitation light is operably coupled with an optic. A first photoluminescent structure is disposed within the optic that is configured to emit a first converted light in response to receiving the excitation light. The badge further includes a reflective member. A second photoluminescent structure is excited by the excitation light that is reflected off of the reflective member.

According to another aspect of the present invention, a badge is disclosed. The badge includes a housing having a viewable portion. A varying width light scattering layer is disposed rearwardly of the viewable portion. A decorative layer is disposed rearwardly of the light scattering layer. An optic is operably coupled with a light source. The light source is configured to emit an excitation light. A first photoluminescent structure is disposed rearwardly of the decorative layer and is configured to emit a first converted light in response to receiving the excitation light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge that may be attached to a vehicle. The badge may include one or more photoluminescent structures configured to convert an excitation light received from an associated light source to a converted light at a different wavelength typically found in the visible spectrum.

Figure 1A:
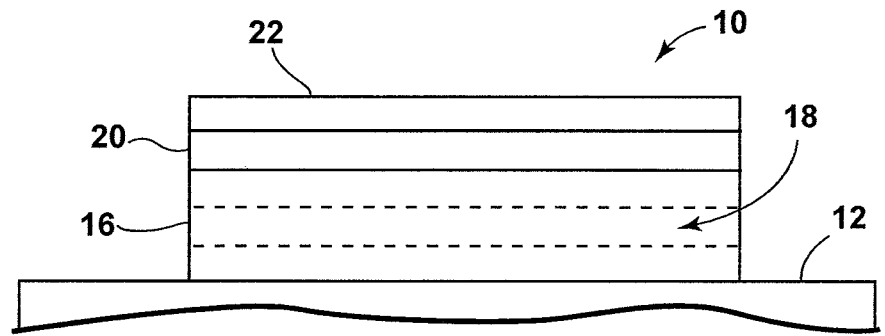
FIG. 1A is a side view of a photoluminescent structure rendered as a coating for use in a vehicle badge according to one embodiment.
Figure 1B:
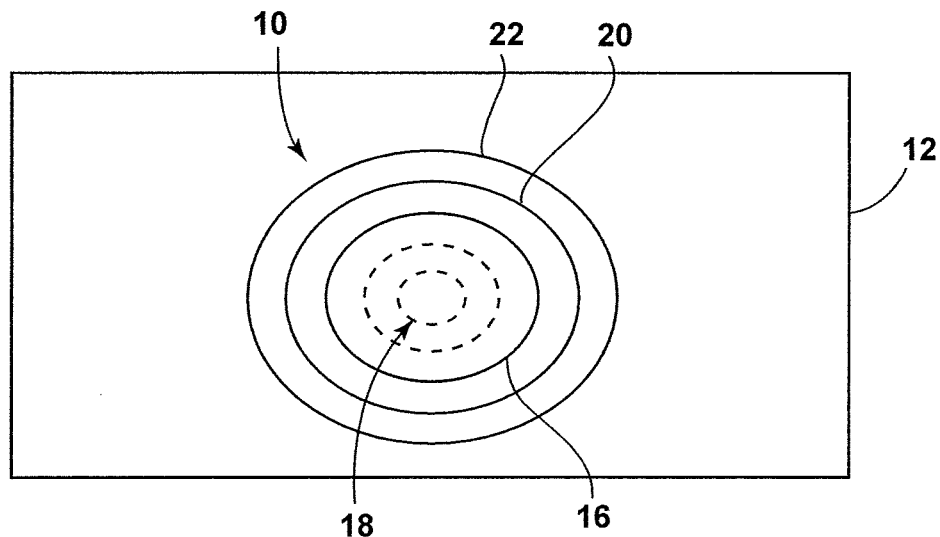
FIG. 1B is a top view of a photoluminescent structure rendered as a discrete particle according to one embodiment.
Figure 1C:
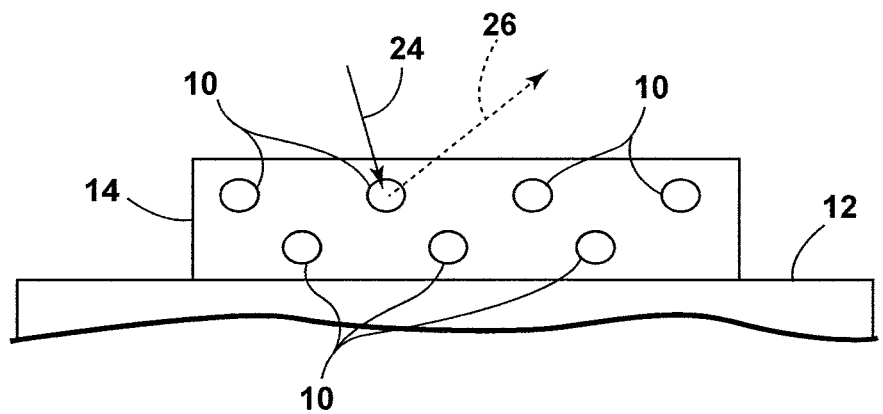
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 42 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, and/or phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has a ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 42. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source 42, such as the sun, and/or any artificial light source 42). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from a plurality of light sources 42 that emit the excitation light 24, including, but not limited to, natural light sources (e.g., the sun) and/or any artificial light source 42. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier support medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
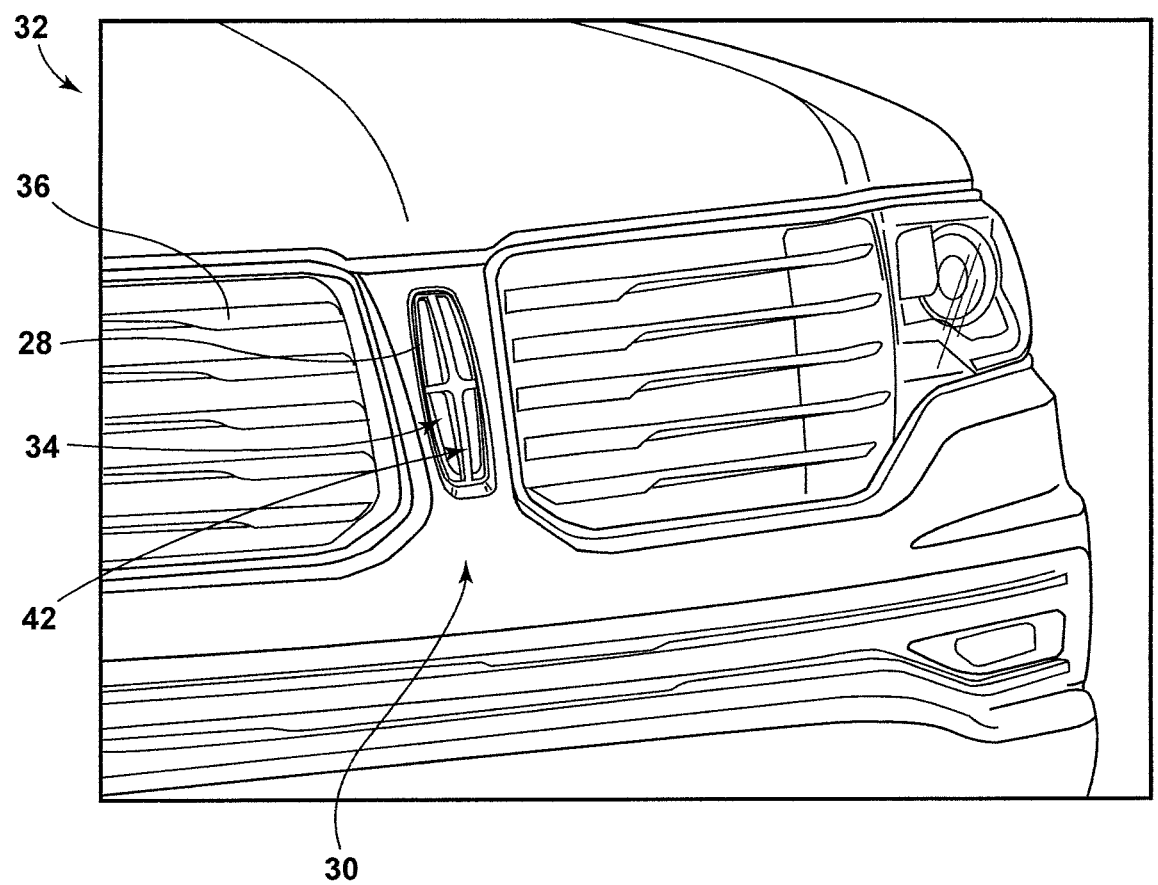
FIG. 2 is a front perspective view of a vehicle equipped with an illuminated badge on a grille assembly of a vehicle, according to one embodiment.

Referring now to FIG. 2, a badge 28 is generally shown mounted on a front portion 30 of a vehicle 32. In other embodiments, the badge 28 may be located elsewhere, such as, but not limited to, other locations of the front portion 30, a side portion, or a rear portion of the vehicle 32. Alternatively, the badge 28 may be disposed inside the vehicle 32. The badge 28 may be configured as an insignia that is presented as an identifying mark of a vehicle manufacturer and includes a viewable portion 34 that is generally prominently displayed on the vehicle 32. In the presently illustrated embodiment, the badge 28 is centrally located on a grille assembly 36 of the vehicle 32, thus allowing the badge 28 to be readily viewed by an observer looking head-on at the vehicle 32. As will be described below in greater detail, one or more light sources 42 may be disposed within the badge 28 and may illuminate in a plurality of manners to provide a distinct styling element to the vehicle 32.

Figure 3:
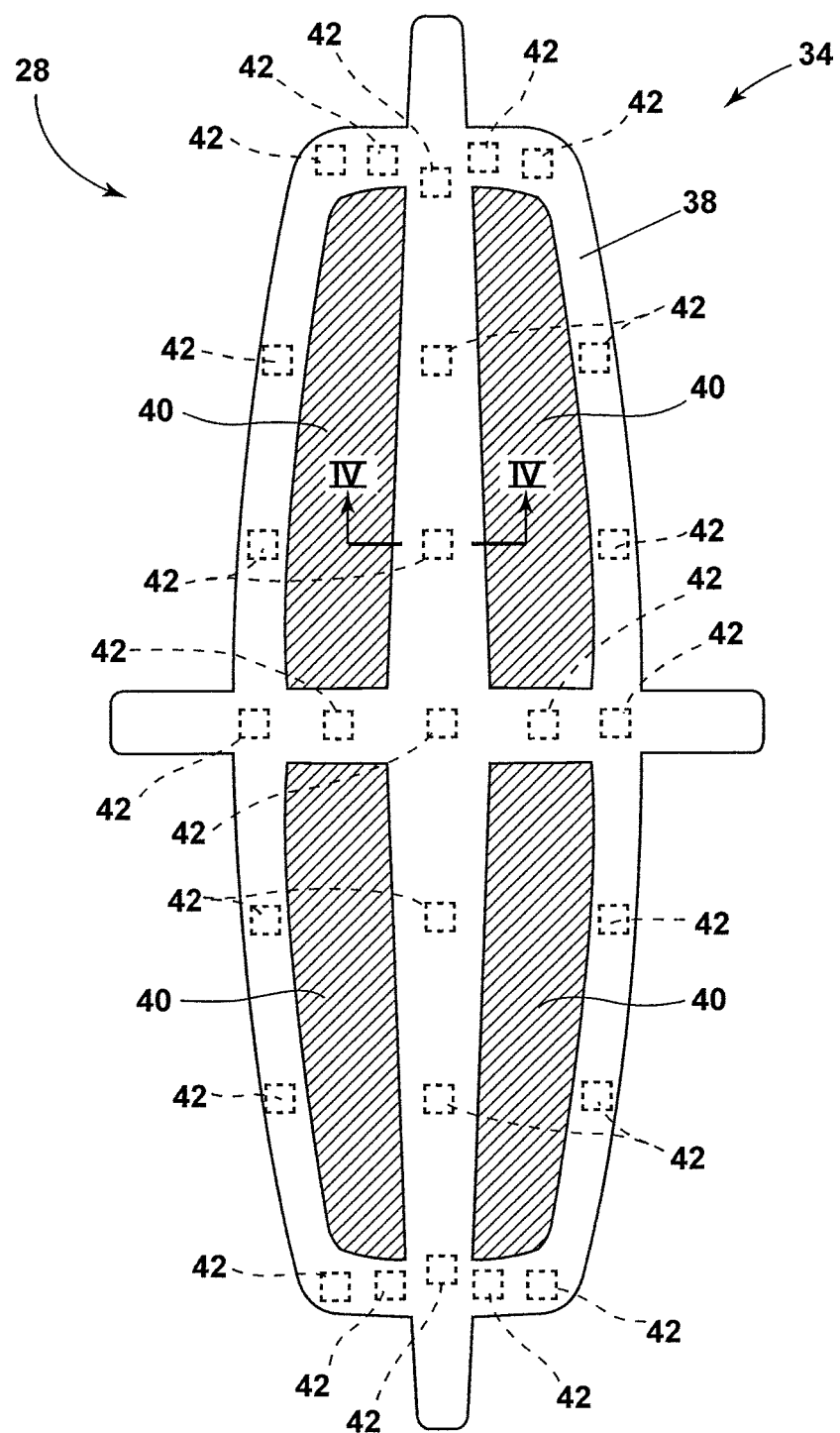
FIG. 3 is a front view of the badge, according to one embodiment, having a light source therein.

Referring to FIG. 3, the viewable portion 34 of the badge 28 is exemplarily shown according to one embodiment. The viewable portion 34 may include a light transmissive portion 38, which may correspond with indicia on the badge 28, and one or more substantially opaque portions 40, which may correspond to a background region of the badge 28 and may be configured as opaque coatings applied to the viewable portion 34. In alternative embodiments, the opaque portions 40 may be left open to the front portion 30 of the vehicle 32. The badge 28 may also include one or more light sources 42 disposed therein. The light source 42 may include any form of light source. For example, fluorescent lighting, light emitting diodes (LEDs), organic LEDs (OLEDs), polymer LEDs (PLEDs), solid state lighting, or any other form of lighting configured to emit light may be utilized. According to one embodiment, the first and/or second light source 42 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR)(~700 nm-1 mm in wavelength) to take advantage of the relative low cost attributable to those types of LEDs.

Additionally, according to one embodiment, any light source 42 within the badge 28 may be configured to sparkle, or flash in one or more colors. The locations of the light sources 42 that sparkle may be chosen to correspond to a corner or edge of the viewable portion 34. The sparkle effect at each location may be produced by light emitted from a corresponding light source 42 that is disposed inside the badge 28. Each light source 42 may be operated to pulse light onto the corresponding sparkle location. According to one embodiment, a pulse of light from a given light source 42 may last approximately $\frac{1}{10}$ to $\frac{1}{100}$ of a second and the light sources 42 may be pulsed randomly or in a pattern.

Figure 4:
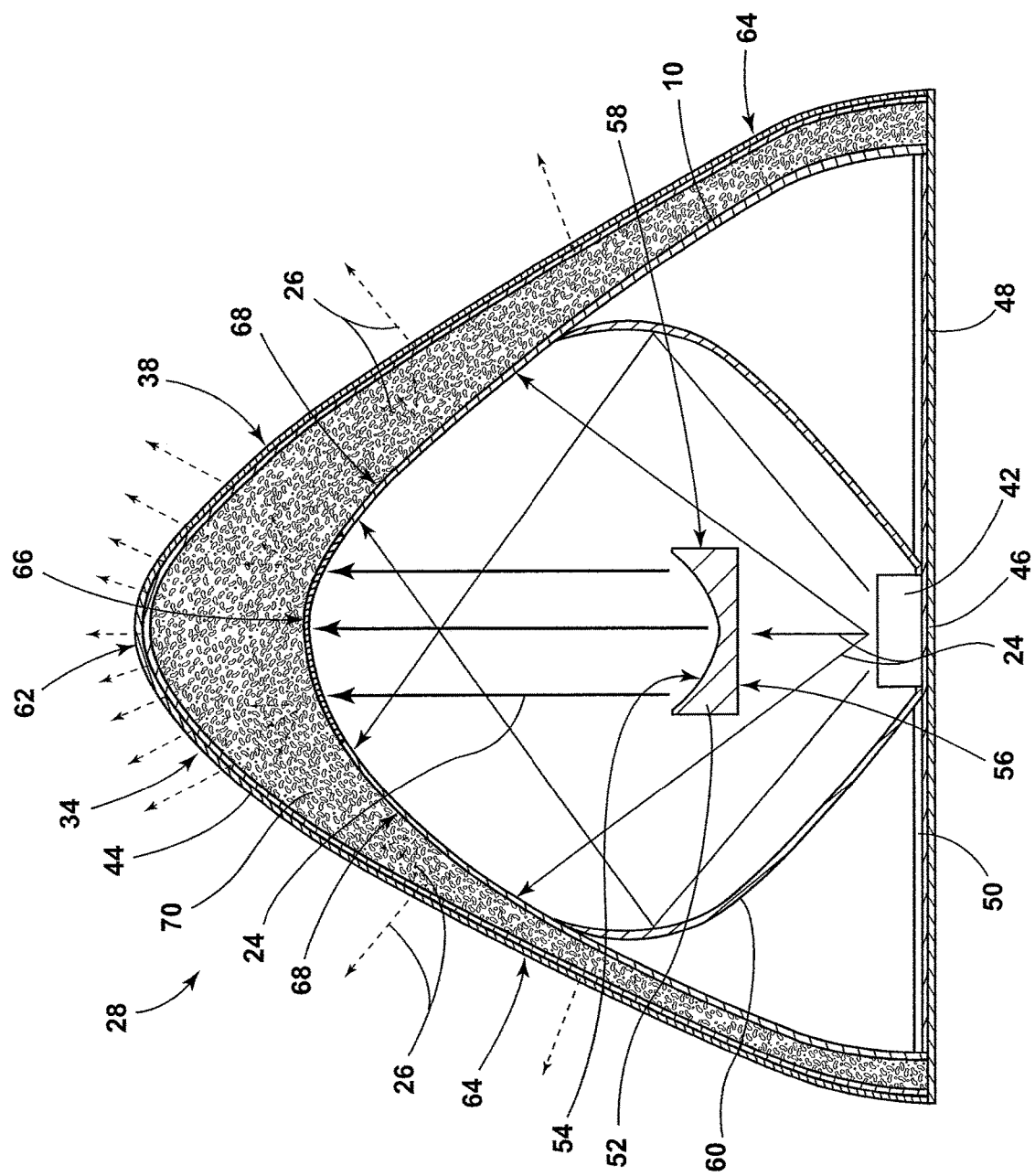
FIG. 4 is a cross-sectional view of the badge taken along line IV-IV of FIG. 3 having an optic and a light scattering layer that includes glass particles disposed within the badge, according to one embodiment.

Referring to FIG. 4, a cross-sectional view of the badge 28 is shown according to an one embodiment taken along the line IV-IV of FIG. 3. The badge 28 includes a housing 44 having the viewable portion 34 described above and a substrate 46 that may be capable of being secured to the vehicle 32. The viewable portion 34 may be arcuate whereas the substrate 46 may be substantially linear. The housing 44 and/or the substrate 46 may be constructed from a rigid material such as, but not limited to, plastic and may be assembled together via sonic or laser welding and/or low-pressure insert molding. Alternatively, or additionally, the housing 44 and the substrate 46 may be assembled together through the use of adhesives or mechanical fasteners. Alternatively still, the housing 44 and the substrate 46 may be integrally formed as a single component.

With respect to the illustrated embodiment, the light source 42 may be provided on a flexible printed circuit board (PCB) 48 that may be secured to the substrate 46. The PCB 48 may include a white solder mask 50 to reflect light incident thereon.

The badge 28 may further include an optic 52, such as any form of lens or prism, to help concentrate light onto predefined locations. The optic 52 may be formed from a single piece of solid, transparent material, including glass, acrylate polymers, such as polymethyl methacrylate (PMMA), and thermoplastic polymers, such as polycarbonate plastics, molded or otherwise formed as a single piece. In some embodiments, the optic 52 may be formed from a single piece of solid, injection-molded acrylic Optionally, some portions of the integrated piece may be tinted or coated, for example with a light-reflecting or obstructing coating, and/or portions of the optic 52 may be painted or otherwise tinted to prevent light escape.

According to one embodiment, the optic 52 may have a generally concave front face 54 and a generally linear rear face 56. Although in other embodiments, the rear face 56 may be concave or convex, depending on the desired focusing properties of the lens. Additionally, the side wall 58 may have convex, flat, or concave, as desired in order to achieve the desired light focusing properties. Although a particular configuration of the optic 52 is illustrated in FIG. 4, one of skill in the art will appreciate that other combinations of flat and/or curved lens surfaces may be substituted to fit a particular application and/or set of beam focusing requirements.

In operation, the optic 52 may interact with the light source 42 in various manners dependent upon, for example, the position of light source 42. For instance, in some embodiments, when the light source 42 is far away from optic 52 (e.g., a narrow angle position), a small fraction of the excitation light 24 emitted from the light source 42 may interact with optic 52. Conversely, when light source 42 is near the optic 52, the optic 52 may influence a second, larger fraction of the beam pattern in a desired manner. Thus, in various embodiments, optic 52 may enable wide angle light distribution, with little effect on narrow angle distribution. Thus, in various embodiments where the optic 52 is in a position closer to the light source 42, the bulk of the excitation light 24 from light source 42 will pass through central focusing element, and will be directed in a wide beam pattern.

Conversely, in various embodiments when the optic 52 is in a forward position (e.g., toward the housing 44), a small portion of the excitation light 24 from the light source 42 will pass through optic 52. Instead, the excitation light 24 from the light source 42 will reflect off of a reflective member 60. The reflective member 60 may extend along at least part of a contoured inner cavity of the badge 28. The reflective member 60 may be formed from a polymeric material or any other suitable material known in the art. The reflector surface may be shaped to generate any desired lighting pattern. It should be appreciated that the reflective member 60 may be one or more separate components disposed within the badge 28. According to one embodiment, the reflective member 60 is geometrically similar to a typical radiation pattern of an LED, as is understood to one of ordinary skill in the art.

The reflective member 60 may be configured to reflect a specific wavelength of light in some embodiments. According to some embodiments, natural excitation light 24 (e.g., emitted from the sun) may penetrate the housing 44 of the badge 28 and be reflected off of the reflective member 60 and back towards desired portions of the housing 44. It will be understood by one of ordinary skill in the art that the reflective member 60 may have any geometry for reflecting excitation light 24 in any desired direction.

According to one embodiment, a photoluminescent structure 10 is disposed between the reflective member 60, or the optic 52, and the housing 44. The excitation light 24 emitted from the light source(s) 42 is converted by the photoluminescent structure 10 into light of a longer wavelength and outputted therefrom. The converted light 26 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structure 10 may be configured such that the converted light 26 outputted therefrom is capable of being expressed as unicolored or multicolored light. According to one embodiment, the light sources 42 are configured to emit blue light and the photoluminescent structure 10 is configured to convert the blue light into a neutral white light having a color temperature of approximately 4000K to 5000K. The converted light 26 escapes from the badge 28 via the viewable portion 34.

According to one embodiment, a central portion 62 of the viewable portion 34 may illuminate in a brighter manner than the peripheral portions 64 of the viewable portion 34 due to the increased amount of excitation light 24 received by the photoluminescent structure 10 disposed on the central portion 62 of the photoluminescent structure 10. Accordingly, the central portion 66 of the photoluminescent structure 10 may have a higher concentration of the photoluminescent material 18 than the peripheral portions 68 of the photoluminescent structure 10. Additionally, or alternatively, the central portion 66 of the photoluminescent structure 10 may have a different photoluminescent material 18 therein such that the excitation light 24 that is transmitted through the optics 52 illuminates the viewable portion 34 in a first color while the excitation light 24 that is not transmitted through the optics 52 illuminates the viewable portion 34 in a second color.

A light scattering layer 70 may be disposed above the first photoluminescent structure 10 and is molded, or alternatively disposed, within the badge 28. The light scattering layer 70 may include clear, translucent, and/or opaque portions and may be any desired color. The light scattering layer 70 generally functions to diffuse the excitation light 24 emitted from the light sources 42 and/or converted light 26 emitted from the photoluminescent structure 10 so that unwanted hot spots and shadows may be minimized. According to one embodiment, the light scattering layer 70 may include glass particles that provide additional light scattering effects to further enhance the attractiveness of the badge 28.

The light scattering layer 70 may have a varied transverse thickness and may be coated with a curable, liquid-based coating that results in a translucent layer for added durability. The light scattering layer 70 may be fabricated according to various methods as known in the art. For example, the light scattering layer 70 may be made using injection molding tools, equipment, and processing conditions. Further, the light scattering layer 70 is attached to the housing 44 and/or the substrate 46 via various mechanical, chemical, and/or thermal techniques that provide a durable seal therebetween. These attachment techniques include, but not limited to, sonic welding, vibration welding, hot plate welding, rotational welding, and adhesive joining.

Figure 5:
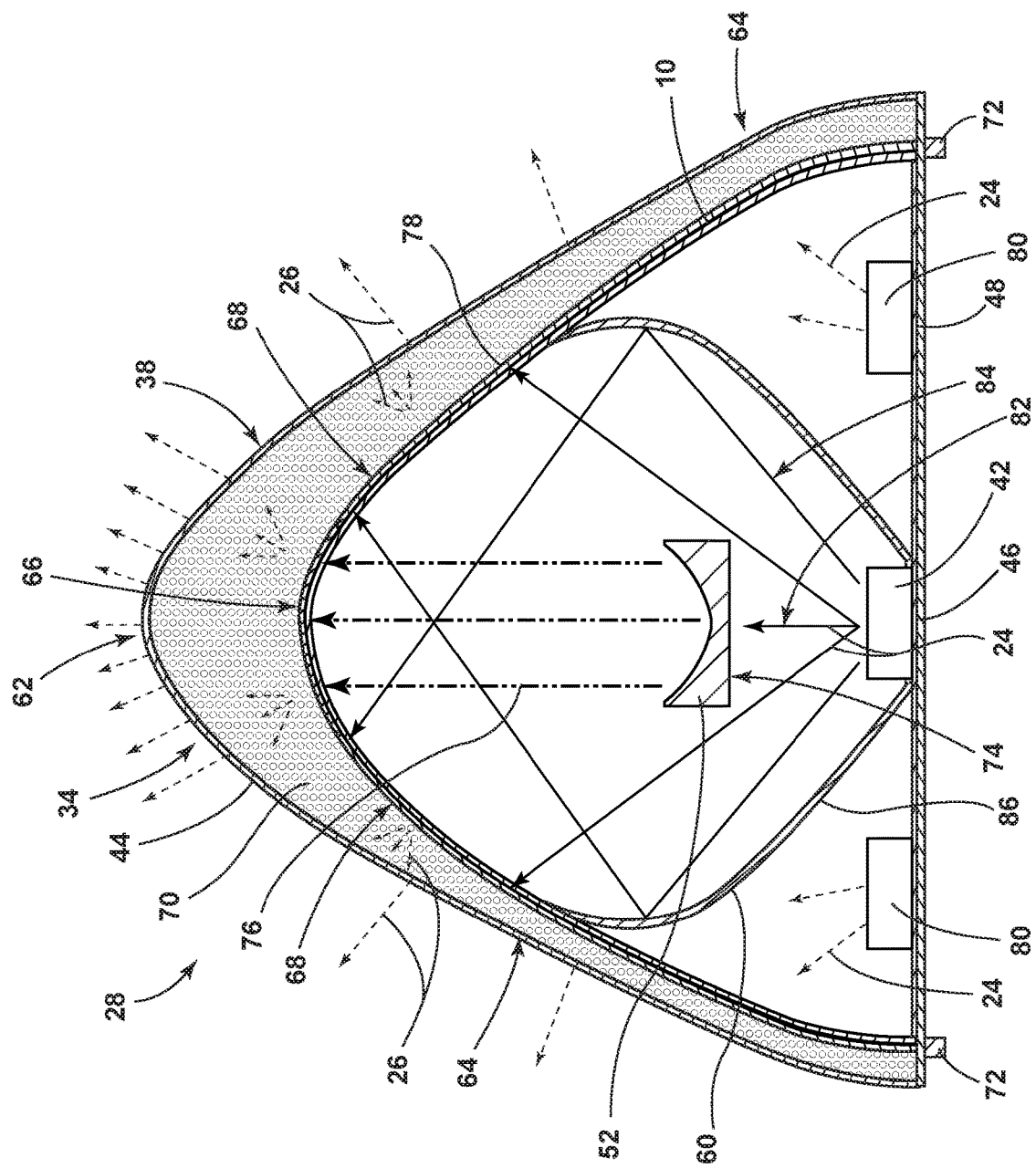
FIG. 5 illustrates a cross-sectional view of an alternate embodiment of the badge taken along line IV-IV of FIG. 3 having a photoluminescent structure disposed within the optic and the light scattering layer that includes a plurality of beads, according to one embodiment.

Referring to FIG. 5, a cross-sectional view of the badge 28 is shown according to an alternate embodiment taken along the line IV-IV of FIG. 3. As described above, the badge 28 includes the substrate 46 that is capable of being secured to a vehicle 32 through attachment points 72. Any practicable means may be used for attaching the badge 28 to the vehicle 32 including, but not limited to, fasteners, adhesives, welding, integrally forming the badge 28 with a vehicle component, and/or any other method known in the art. The substrate 46 may be a dark, high gloss material, thereby concealing any circuitry of the badge 28 and attachment points 72.

As illustrated in FIG. 5, the light scattering layer 70 is configured as a plurality of beads. The beads may be formed from a glass and/or a polymeric material. The beads, according to one embodiment, are substantially monodispersed in size and/or shape. According to an alternate embodiment, the beads may be configured in a variety of sizes and/or shapes that are randomly distributed within the light scattering layer 70. Additionally, the photoluminescent structure 10 may be disposed within the beads in some embodiments.

With reference to FIG. 5, the badge 28 includes a first photoluminescent structure 10 that is disposed between the light scattering layer 70 and the light source 42 in a uniform or non-uniform manner, as described above. Accordingly, the light scattering layer 70 may partially, or substantially conceal, the inward layers and/or components of the badge 28. For example, the light scattering layer 70 may conceal the photoluminescent structure 10, and more particularly, the color or natural hue of the photoluminescent structure 10. Additionally, the light scattering layer 70 may also conceal the optic 52, the reflective member 60, and/or any other components disposed between the housing 44 and the substrate 46.

A second photoluminescent structure 74 may be disposed within the optic 52 such that excitation light 24 enters the optic 52 and a second converted light 76 exits the optic 52. According to one embodiment, the first photoluminescent structure 10 emits blue converted light 26 and the second photoluminescent structure 74 emits white converted light 76. However, it will be appreciated that the first and/or second photoluminescent structures 10, 74 may emit any color of converted light 26.

According to one embodiment, the first photoluminescent structure 10 contains a long persistence photoluminescent material 18 that may be excited by natural excitation light 24 (e.g., the sun) in addition to the excitation light 24 emitted by the light source 42. The natural excitation light 24 may enter the badge 28 from outside of the housing 44 and excite the first photoluminescent structure 10. Some of the natural excitation light 24 that enters through the housing 44 may pass through the first photoluminescent structure 10. The natural excitation light 24 may then be reflected off of the reflective member 60 and redirected back towards the first photoluminescent structure 10 to further excite the photoluminescent materials 18 therein.

With further reference to FIG. 5, the badge 28 may include a decorative layer 78 that is forwardly of the first and/or second photoluminescent structures 10, 74. The decorative layer 78 may include a polymeric material or any other suitable material and is configured to control or modify an appearance of the viewable portion 34. For example, the decorative layer 78 may be configured to confer a metallic appearance to the viewable portion 34. The metallic appearance can be disposed rearwardly of the housing 44 through any method known in the art, including, but not limited to, sputter deposition, vacuum deposition (vacuum evaporation coating), electroplating, or directly printing onto any component of the badge 28. The metallic appearance may be chosen from a wide range of reflective materials and/or colors, including, but not limited to, silver, chrome, copper, bronze, gold, any other metallic material, and/or any imitator thereof. Additionally, an imitator of any metallic material may also be utilized without departing from the teachings provided herein.

Accordingly, a light transmissive portion 38 may illuminate when the light source 42 is illuminated and confer a metallic appearance in the unilluminated state. The opaque portions 40, if disposed on the badge 28, may also be colored any desired color and/or incorporate a metallized finish on portions thereof. In other embodiments, the decorative layer 78 may be tinted any color to complement the vehicle structure on which the badge 28 is to be received. In any event, the decorative layer 78 should be at least partially light transmissible such that the converted light 26 is not prevented from illuminating the viewable portion 34 whenever an energy conversion process is underway. Alternate processes may be used for coloring or layering material onto a portion of the housing 44 and/or the substrate 46, as known in the art without departing from the teachings provided herein.

Referring still to FIG. 5, the badge 28 may include a plurality of independently illuminable light sources 42, 80 disposed both inwardly (e.g., light source 42) and outwardly (e.g., light source 80) of the reflective member 60. Accordingly, a first portion 82 of excitation light 24 emitted by a centrally disposed light source 42 may be directed through the optic 52, which may be reemitted as the second converted light 76, and towards a first portion 62 of the viewable portion 34. A second portion 84 of the excitation light 24 emitted by the centrally disposed light source 42 may reflect off of the reflective member 60 and through a larger portion 64 of the viewable portion 34. It will be appreciated that the excitation light 24 emitted from the centrally disposed light source 42 may be emitted through any portion of the viewable portion 34 without departing from the teachings provided herein.

One or more peripheral light sources 80 may be disposed outwardly of the reflective member 60 and configured to emit excitation light 24 towards a peripheral portion 68 of the first photoluminescent structure 10 thereby illuminating the peripheral portion of the viewable portion 34. The excitation light 24 emitted by the peripheral light sources 80 may be reflected off of an outwardly facing surface 86 of the reflective member 60 prior to exciting the first photoluminescent structure 10.

Figure 6:
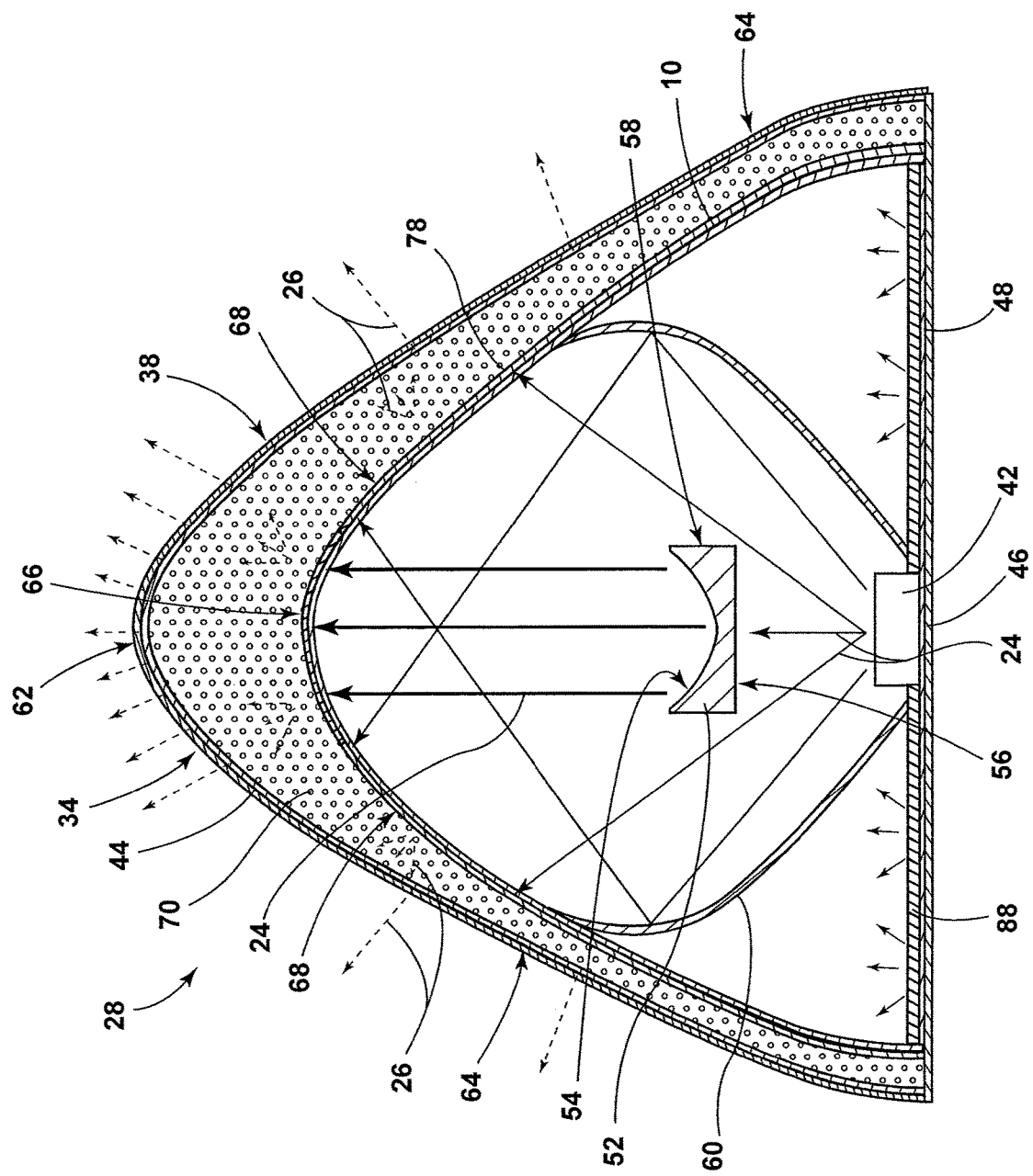
FIG. 6 illustrates a cross-sectional view of an alternate embodiment of the badge taken along line IV-IV of FIG. 3 having a plurality of light sources therein.

Referring to FIG. 6, the light source 42 may be operably coupled with an optical grade light guide 88, which is a substantially transparent or translucent guide suitable for transmitting light. The light guide 88 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 88.

Further, the light guide 88 may be a flexible light guide, wherein a suitable flexible material is used to create the light guide 88. Such flexible materials include urethanes, silicone, thermoplastic polyurethane (TPU), or other like optical grade flexible materials. Whether the light guide 88 is flexible or rigid, the light guide 88, when formed, is substantially optically transparent and/or translucent and capable of transmitting light. The light guide 88 may be referred to as a light pipe, a light plate, a light bar or any other light carrying or transmitting substrate made from a clear or substantially translucent plastic. Known methods of attaching the light guide 88 to the badge 28 include the bonding of a preformed light guide 88 within the badge 28 by adhesion, such as by using a double-sided tape, or by mechanical connections such as brackets that are formed into the substrate 46.

According to an alternate embodiment, the light source 42 may be configured as a plurality of LEDs that may be printed onto the substrate 46, the PCB 48, or any other component of the badge 28 to direct light towards the viewable portion 34. Additional information regarding the construction of vehicle components incorporating printed LEDs therein is disclosed in U.S. patent application Ser. No. 14/851,726 to Salter et al., entitled "ILLUMINATED STEERING ASSEMBLY," filed Sep. 11, 2015, the entire disclosure of which is hereby incorporated herein by reference.

Figure 7:
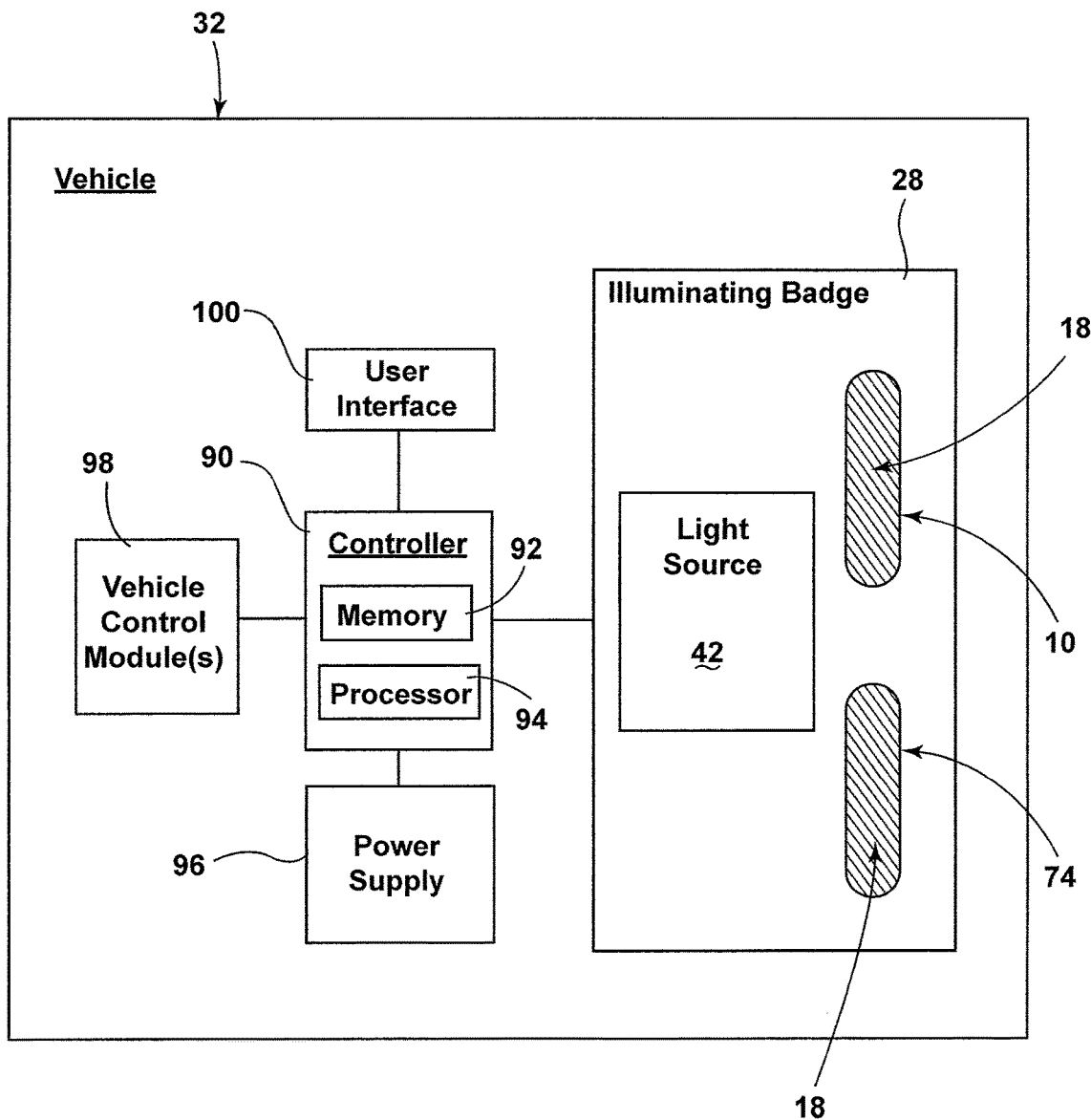
FIG. 7 is a block diagram of the vehicle including the badge and the lighting control.

Referring to FIG. 7, a block diagram of a vehicle 32 is generally shown in which the badge 28 is implemented. The badge 28 includes a controller 90 in communication with the light source 42. The controller 90 may include memory 92 having instructions contained therein that are executed by a processor 94 of the controller 90. The controller 90 may provide electrical power to the light source 42 via a power source 96 that may be located onboard the vehicle 32. In addition, the controller 90 may be configured to control the excitation light 24 emitted from each light source 42 within the badge 28 based on feedback received from one or more vehicle control modules 98 such as, but not limited to, a body control module, engine control module, steering control module, brake control module, the like, or a combination thereof. By controlling the light output of the light source 42, the badge 28 may illuminate in a variety of colors and/or patterns to provide an aesthetic appearance, such as a prismatic appearance, or may provide vehicle information to an intended observer. For example, the badge 28 may illuminate based on a variety of vehicle predefined conditions, such as, but not limited to, a car finding feature, a remote start indicator, a door lock indicator, a door ajar indicator, a running light, etc.

In operation, the first and/or the second photoluminescent structures 10, 74 receive the excitation light 24 and, in response, emits the converted light 26 therefrom. The first and/or the second photoluminescent structure(s) 10, 74 may contain a long persistent photoluminescent material 18 such that the photoluminescent structure 10, 74 continues to emit the converted light 26 for a period of time after the excitation light 24 is no longer present. For example, according to one embodiment, the first and/or the second photoluminescent structure 10, 74 may continue to emit light for eight hours after the removal of the excitation light 24. Additionally, or alternatively, the first and/or the second photoluminescent structure(s) 10, 74 may contain a short persistent photoluminescent material 18 such that the photoluminescent structure 10, 74 stops emitting the converted light 26 shortly after the excitation light 24 is no longer present.

In an alternate embodiment, the light source 42 may pulse light at predefined times, such as every five minutes, to re-excite the photoluminescent material 18 disposed within the first and/or the second photoluminescent structures 10, 74 to continuously emit the converted light 26 above a pre-defined intensity therefrom. The controller 90 may pulse light from any light source 42 at any frequency without departing from the teachings provided herein.

The photoluminescent structure(s) 10, 74 may exhibit periodic unicolor or multicolor illumination. For example, the controller 90 may prompt the light source 42 to periodically emit only the first wavelength of excitation light 24 to cause the first photoluminescent structure 10 to periodically illuminate in the first color. Alternatively, the controller 90 may prompt the light source 42 to periodically emit only the second wavelength of excitation light 24 to cause the second photoluminescent structure 74 to periodically illuminate in the second color. Alternatively, the controller 90 may prompt the light source 42 to simultaneously and periodically emit the first and second wavelengths of excitation light 24 to cause the first and second photoluminescent structures 10, 74 to simultaneously illuminate in a third color defined by an additive light mixture of the first and second colors. Alternatively still, the controller 90 may prompt the light source 42 to alternate between periodically emitting the first and second wavelengths of excitation light 24 to cause the first and second photoluminescent structures 10, 74 to periodically illuminate by alternating between the first and second colors. The controller 90 may prompt the light source 42 to periodically emit the first and/or the second wavelengths of excitation light 24 at a regular time interval and/or an irregular time interval.

In another embodiment, the badge 28 may include a user interface 100. The user interface 100 may be configured such that a user may control the wavelength of excitation light 24 that is emitted by the light source 42. Such a configuration may allow a user to control the illumination patterns of the badge 28.

With respect to the above examples, the controller 90 may modify the intensity of the emitted first and second wavelengths of excitation light 24 by pulse-width modulation or current control. Also, the controller 90 may vary power to each light source 42 from 1 to 5 times steady state current to vary the color and brightness of each illumination. The controller 90 may also illuminate multiple colors within a single multicolored light source 42 concurrently, thereby producing additional color configurations.

In some embodiments, the controller 90 may be configured to adjust a color of the emitted light by sending control signals to adjust an intensity or energy output level of the light source 42. For example, if the light source(s) 42 are configured to emit excitation light 24 at a low level, substantially all of excitation light 24 may be converted to the converted light 26 by the first and/or the second photoluminescent structures 10, 74. In this configuration, a color of light corresponding to the converted light 26 may correspond to the color of the emitted light from the badge 28. If the light source(s) 42 are configured to emit excitation light 24 at a high level, only a portion of the excitation light 24 may be converted to the converted light 26 by the first and/or the second photoluminescent structures 10, 74. In this configuration, a color of light corresponding to mixture of the excitation light 24 and the converted light 26 may be output as the emitted light. In this way, the controller 90 may control an output color of the emitted light.

Though a low level and a high level of intensity are discussed in reference to the excitation light 24, it shall be understood that the intensity of the excitation light 24 may be varied among a variety of intensity levels to adjust a hue of the color corresponding to the emitted light from the badge 28. The variance in intensity may be manually altered, or automatically varied by the controller 90 based on predefined conditions. According to one embodiment, a first intensity may be output from the badge 28 when a light sensor senses daylight conditions. A second intensity may be output from the badge 28 when the light sensor determines the vehicle 32 is operating in a low light environment.

As described herein, the color of the converted light 26 may be significantly dependent on the particular photoluminescent materials 18 utilized in the first and second photoluminescent structures 10, 74. Additionally, a conversion capacity of the first and second photoluminescent structures 10, 74 may be significantly dependent on a concentration of the photoluminescent material 18 utilized in the photoluminescent structures 10, 74. By adjusting the range of intensities that may be output from the light source(s) 42, the concentration, types, and proportions of the photoluminescent materials 18 in the photoluminescent structures 10, 74 discussed herein may be operable to generate a range of color hues of the emitted light by blending the excitation light 24 with the converted light 26. Moreover, the first and second photoluminescent structures 10, 74 may include a wide range of photoluminescent materials 18 that are configured to emit the converted light 26 for varying lengths of time.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge for a vehicle, comprising:
a housing having a viewable portion;
a reflective member disposed within the housing and dividing the housing between first and second portions;
a first light source disposed within the first portion of the housing and operably coupled with an optic directed towards the viewable portion of the housing, the optic also disposed within the housing;
a second light source disposed within the second portion of the housing; and
wherein a first portion of excitation light emitted from the first light source is directed through the optic towards a first portion of the viewable portion of the housing, and further wherein a second portion of excitation light emitted from the first light source is directed around the optic and is reflected by the reflective member towards a second portion of the viewable portion of the housing, and further wherein a third portion of excitation light is emitted by the second light source towards a peripheral portion of the housing.

2. The badge for a vehicle of claim 1, further comprising:
a photoluminescent structure including at least one photoluminescent material therein configured to convert excitation light received from the first light source into a visible converted light.

3. The badge for a vehicle of claim 2, wherein the photoluminescent structure is disposed between the first light source and the housing.

4. The badge for a vehicle of claim 3, further comprising:
a decorative layer disposed between the photoluminescent structure and the housing.

5. The badge for a vehicle of claim 4, further comprising:
a light scattering layer disposed between the decorative layer and the housing.

6. The badge for a vehicle of claim 2, wherein the photoluminescent structure includes a variable concentration of photoluminescent material.

7. A badge for a vehicle, comprising:
a housing having a viewable portion;
a reflective member disposed within the housing and dividing the housing between first and second portions;
a varying width light scattering layer disposed rearwardly of the viewable portion and within the housing;
a decorative layer rearwardly of the light scattering layer within the housing;
an optic operably coupled with a first light source disposed within the housing, wherein a first portion of excitation light emitted from the first light source is directed through the optic towards a first portion of the viewable portion of the housing along a first excitation light path, and further wherein a second portion of excitation light emitted from the first light source is directed around the optic and is reflected by the reflective member towards a second portion of the viewable portion of the housing along a second excitation light path; and
a first photoluminescent structure disposed rearwardly of the decorative layer, wherein the photoluminescent structure is configured to emit a first converted light in response to directly receiving excitation light emitted from the first light source along the second excitation light path; and
a second light source disposed in the second portion of the housing, wherein a third portion of excitation light is emitted by the second light source towards a peripheral portion of the housing.

8. The badge for a vehicle of claim 7, further comprising:
a light guide operably coupled with the first light source and configured to emit outwardly of the first light source.

9. The badge for a vehicle of claim 7, wherein the reflective member encompasses the optic on two lateral sides thereof.

* * * * *